US012588065B2

(12) United States Patent
Li

(10) Patent No.: US 12,588,065 B2
(45) Date of Patent: Mar. 24, 2026

(54) RANDOM ACCESS SIGNAL TRANSMISSION METHOD AND TERMINAL

(71) Applicant: VIVO MOBILE COMMUNICATION CO., LTD., Dongguan (CN)

(72) Inventor: Gen Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 690 days.

(21) Appl. No.: 17/987,794

(22) Filed: Nov. 15, 2022

(65) Prior Publication Data

US 2023/0074126 A1 Mar. 9, 2023

Related U.S. Application Data

(63) Continuation of application No. PCT/CN2021/093011, filed on May 11, 2021.

(30) Foreign Application Priority Data

May 15, 2020 (CN) .......................... 202010414524.0

(51) Int. Cl.
*H04W 74/08* (2024.01)
*H04W 74/00* (2009.01)
(Continued)

(52) U.S. Cl.
CPC ..... *H04W 74/006* (2013.01); *H04W 74/0833* (2013.01); *H04W 74/0836* (2024.01)

(58) Field of Classification Search
CPC ........... H04W 72/0446; H04W 74/002; H04W 74/0836; H04W 74/006; H04W 74/0808; H04W 74/0833
See application file for complete search history.

(56) References Cited

U.S. PATENT DOCUMENTS

| | | | | |
|---|---|---|---|---|
| 11,076,432 B2 * | 7/2021 | Islam | .................. | H04W 74/085 |
| 11,606,815 B2 * | 3/2023 | Sun | ..................... | H04W 56/001 |

(Continued)

FOREIGN PATENT DOCUMENTS

| | | |
|---|---|---|
| CN | 110545582 A | 12/2019 |
| CN | 110856180 A | 2/2020 |

(Continued)

OTHER PUBLICATIONS

International Search Report issued in corresponding International Application No. PCT/CN2021/093011, mailed Jun. 18, 2021, 4 pages.

(Continued)

*Primary Examiner* — Bailor C Hsu
(74) *Attorney, Agent, or Firm* — IPX PLLC

(57) ABSTRACT

A random access signal transmission method, a terminal, and a non-transitory computer-readable storage medium are provided. The random access signal transmission method includes: determining a target time range according to a time domain position of a target downlink signal within a fixed frame period; and determining a Random Access Channel (RACH) occasion intersected with the target time range within the fixed frame period as an invalid RACH occasion (Continued)

Determine a target time range according to a time domain position of a target downlink signal within a fixed frame period — 41

Determine a random access channel (RACH) occasion intersected with the target time range within the fixed frame period as an invalid random access channel (RACH) occasion according to configuration information of the fixed frame period and configuration information of the random access channel (RACH) occasion — 42 according to configuration information of the fixed frame period and configuration information of the RACH occasion.

19 Claims, 7 Drawing Sheets

(51) Int. Cl.
H04W 74/0833 (2024.01)
H04W 74/0836 (2024.01)

(56) References Cited

U.S. PATENT DOCUMENTS

| | | | | |
|---|---|---|---|---|
| 12,167,474 | B2 * | 12/2024 | Xiong | H04W 72/0446 |
| 12,356,466 | B2 * | 7/2025 | Ly | H04W 72/0446 |
| 12,506,584 | B2 * | 12/2025 | Xue | H04L 5/14 |
| 2019/0306892 | A1 * | 10/2019 | Xiong | H04W 74/0833 |
| 2019/0394799 | A1 * | 12/2019 | Islam | H04W 74/02 |
| 2020/0053637 | A1 * | 2/2020 | Tsai | H04L 5/0094 |
| 2020/0229242 | A1 * | 7/2020 | Xiong | H04W 74/002 |
| 2020/0267763 | A1 * | 8/2020 | Deogun | H04W 74/0825 |

FOREIGN PATENT DOCUMENTS

| | | | |
|---|---|---|---|
| CN | 110972294 | A | 4/2020 |
| CN | 111107628 | A | 5/2020 |
| CN | 111107662 | A | 5/2020 |
| WO | 2019104299 | A1 | 5/2019 |
| WO | 2019194533 | A1 | 10/2019 |

OTHER PUBLICATIONS

Extended European Search Report issued in related European Application No. 21803948.5, mailed Sep. 26, 2023, 10 pages.
Samsung: "Enhancements to Initial Access Procedure for NR-U", 3GPP Draft; R1-1912450, Nov. 2019, 11 pages.
Nokia et al: "On DL signals and channels", 3GPP Draft; R1-1912279, Nov. 2019, 19 pages.
Nokia et al: "Channel access and co-existence for NR-U operation", 3GPP Draft; R1-1912257, Nov. 2019, 10 pages.
Notice of Reason of Refusal issued in related Japanese Application No. 2022-569443, Feb. 6, 2024, 3 pages.

* cited by examiner

21

22

RANDOM ACCESS SIGNAL TRANSMISSION METHOD AND TERMINAL

CROSS-REFERENCE TO RELATED APPLICATIONS

This application is a continuation of International Application No. PCT/CN2021/093011, filed on May 11, 2021, which claims the priority of Chinese Patent Application No. 202010414524.0 filed on May 15, 2020. The entire contents of each of the above-referenced applications are expressly incorporated herein by reference.

TECHNICAL FIELD

Embodiments of the present disclosure relate to the field of wireless communication technologies, and in particular, to a random access signal transmission method and a terminal.

BACKGROUND

A New Radio (NR) system run at an unlicensed band may be run in a Frame Based Equipment (FBE) channel access mode. In such a mode, it is necessary for all uplink transmissions to confirm that a channel is obtained from a base station within a Fixed Frame Period (FFP), that is, a downlink signal needs to be detected within the fixed frame time before the terminal transmits uplink data, to confirm validity of the fixed frame period. Failure of transmitting a random access signal may be caused due to lack of downlink signal configuration or insufficient time for processing the downlink signal within the fixed frame period, seriously affecting access performance of the system.

SUMMARY

Embodiments of the present disclosure provide a random access signal transmission method and a terminal.

The present disclosure is implemented in the following way:

According to a first aspect, an embodiment of the present disclosure provides a random access signal transmission method, applied to a terminal, the method including:

determining a target time range according to a time domain position of a target downlink signal within a fixed frame period; and determining a Random Access Channel (RACH) occasion intersected with the target time range within the fixed frame period as an invalid RACH occasion according to configuration information of the fixed frame period and configuration information of the RACH occasion.

According to a second aspect, an embodiment of the present disclosure further provides a terminal, including:

a first determination module, configured to determine a target time range according to a time domain position of a target downlink signal within a fixed frame period; and a second determination module, configured to determine a random access channel (RACH) occasion intersected with the target time range within the fixed frame period as an invalid RACH occasion according to configuration information of the fixed frame period and configuration information of the RACH occasion.

According to a third aspect, an embodiment of the present disclosure provides a terminal, including a processor, a memory, and a computer program stored in the memory and executable by the processor, the computer program, when executed by the processor, implementing the steps of the random access signal transmission method according to the first aspect.

According to a fourth aspect, an embodiment of the present disclosure provides a non-transitory computer-readable storage medium, the non-transitory computer-readable storage medium storing a computer program, the computer program, when executed by a processor, implementing the steps of the random access signal transmission according to the first aspect.

According to a fifth aspect, an embodiment of the present disclosure provides a computer software product, the computer software product being stored in a non-volatile storage medium and being configured to be executed by at least one processor to implement the steps of the random access signal transmission method according to the first aspect.

In the embodiments of the present disclosure, a target time range may be determined according to a target downlink signal within a fixed frame period, and a RACH occasion intersected with the target time range within the fixed frame period may be determined as an invalid RACH occasion that is not used for mapping with a synchronization signal and PBCH block, which can avoid the problem that a random access signal cannot be transmitted due to lack of downlink signal configuration or insufficient time for processing a downlink signal within the fixed frame period, affecting access performance of a system.

BRIEF DESCRIPTION OF THE DRAWINGS

Various other advantages and benefits may become clear to a person of ordinary skill in the art by reading the following detailed description of exemplary implementations. The accompanying drawings are merely used for illustrating the exemplary implementations and are not intended to constitute a limitation on the present disclosure. Throughout the accompanying drawings, the same reference numerals are used to represent the same components. In the accompanying drawings.

DETAILED DESCRIPTION

In addition, the terms "include" and any variant thereof in the description and claims of this application are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device. In addition, "and/or" used in the description and claims represents at least one of connected objects. For example, A and/or B represents the following three cases: Only A exists, only B exists, and both A and B exist.

In the embodiments of the present disclosure, the term such as "exemplarily" or "for example" is used to represent giving an example, an illustration, or a description. Any embodiment or design scheme described as an "exemplarily" or "for example" in the embodiments of the present disclosure should not be explained as being more preferred or having more advantages than another embodiment or design scheme. Exactly, the term such as "exemplarily" or "for example" is intended to present a related concept in a specific manner.

The following describes the embodiments of the present disclosure with reference to the accompanying drawings. A random access signal transmission method and a terminal provided in the embodiments of the present disclosure are applicable to a wireless communication system. The wireless communication system may be a $5^{th}$ Generation (5G) system, an evolved Long Term Evolution (eLTE) system, or a subsequent evolution communication system.

Figure 1:
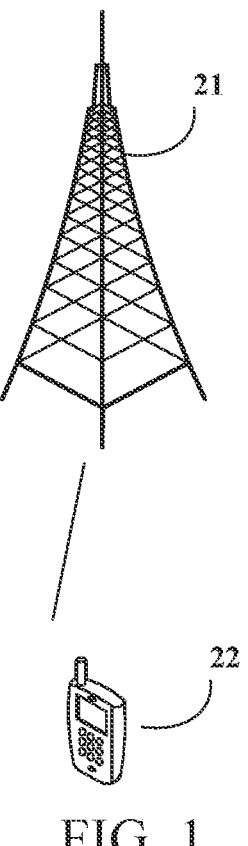
FIG. 1 is a schematic architectural diagram of a wireless communication system according to an embodiment of the present disclosure.

Referring to FIG. 1, FIG. 1 is a schematic architectural diagram of a wireless communication system according to an embodiment of the present disclosure. As shown in FIG. 1, the wireless communication system may include: a network side device 11 and a terminal 12, where the terminal 12 may be connected to the network side device 11. In an actual application, connections between the foregoing devices may be wireless connections. For convenience of visually showing a connection relationship between the devices, solid lines are used for illustration in FIG. 1.

It should be noted that, the foregoing communication system may include a plurality of terminals 12, and the network side device 11 may further communicate (transmit signaling or data) with the plurality of terminals 12.

The network side device 11 provided in this embodiment of the present disclosure may be a base station. The base station may be a base station. The base station may be a commonly used base station, or may be an evolved node base station (eNB), or may be a network side device (for example, a next generation node base station (gNB) or a Transmission and Reception Point (TRP) or a cell in a 5G system), or may be a network side device in a subsequent evolution communication system.

The terminal 12 provided in this embodiment of the present disclosure may be a mobile phone, a tablet computer, a notebook computer, an Ultra-Mobile Personal Computer (UMPC), a netbook, a Personal Digital Assistant (PDA), or the like.

First, communication terms involved in the embodiments of the present disclosure are described below.
(1) Unlicensed Communication System In a future communication system, an unlicensed band may be used as a supplement to a licensed band to help an operator expand services. The unlicensed band is shared by a plurality of Radio Access Technologies (RATs) such as Wireless Fidelity (Wi-Fi), radar, LTE-License Assisted Access (LTE-LAA), and the like. Therefore, in some countries or regions, the use of the unlicensed band needs to comply with regulatory regulations to ensure that all devices can fairly share the resource. For example, in a case that a transmitting node needs to transmit information, Listen Before Talk (LBT) is first required to be performed on a designated radio channel to perform Energy Detection (ED) on a surrounding wireless transmission environment. The channel is determined to be idle in a case that energy is lower than a certain threshold, and transmission may be performed in this case. Otherwise, the channel is determined to be busy in a case that the energy is higher than a certain threshold, and the transmission node cannot perform transmission in this case. The transmitting device may be a base station, a User Equipment (UE), a Wi-Fi Access Point (AP), and the like. After the transmitting node starts to perform transmission, a time occupied by the channel cannot exceed a Maximum Channel Occupancy Time (MCOT).
(2) FBE Network Operation An FBE means that transmission/reception by the equipment regularly adopts a periodic structure with a period of a fixed frame period.

An FBE node occupies a channel by using an LBT-based channel access mechanism. A node that initiates a transmission sequence including one or more times of consecutive transmission is referred to as an initiating node, and other devices are referred to as responding nodes. The FBE node may be an initiating node, a responding node, or a node simultaneously supporting two node functions.

Figure 2:
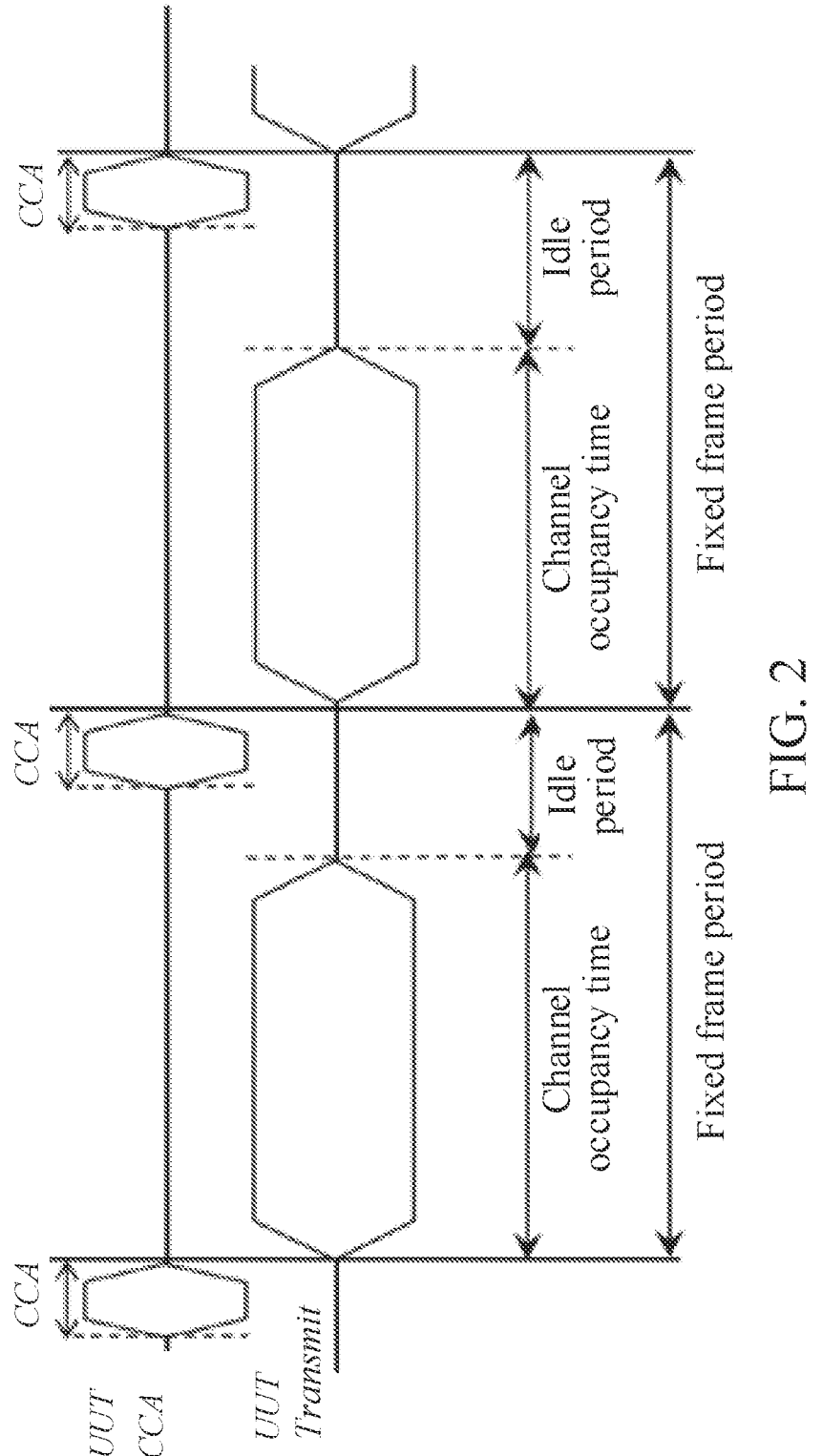
FIG. 2 is a schematic diagram of an operation of an initiating node.

For an example of an operation of the initiating node, reference may be made to FIG. 2, and operation requirements include:

1) A value set of a fixed frame period supported by the node is stated by a device manufacturer, and each value is required to be in a range of 1 to 10 ms. Transmission may only be initiated at the beginning of a fixed frame period. The node may change a fixed frame period currently applied by the node, but the frequency cannot be higher than 200 ms at a time.

2) Before starting transmission at the beginning of the fixed frame period, the transmitting node may perform Clear Channel Assess (CCA). Transmission may be immediately performed in a case that the channel is determined to be idle, or otherwise, transmission (except for short control signaling transmissions as specified by regulatory requirements) is not allowed to be performed within the remaining fixed frame period.

3) Within a fixed frame period in which transmission has been performed, a total duration that a corresponding initiating node may perform transmission without reassessing availability of the channel is defined as a Channel Occupancy Time (COT). The initiating node may perform transmission for a plurality of times on a designated channel within the COT, and there is no need to perform additional CCA as long as each time interval between adjacent transmissions of such transmissions does not exceed 16 μs. In a case that each time interval between adjacent transmissions within the COT exceeds 16 μs, the initiating node needs to perform additional CCA before continuing to perform transmission, and transmission is continued to be performed only in a case that the channel is determined to be idle based on CCA. Each time interval between adjacent transmissions is included in the COT.

4) The initiating node may authorize a permission of a designated channel of a period within the COT to one or more associated responding nodes for transmission.

5) The COT cannot be longer than 95% of the fixed frame period, and there is an idle period (Idle Period) immediately following the COT. The idle period lasts until a start moment of a next fixed frame period, so that the length of the idle period is at least 5% of the fixed frame period, and a minimum value of the idle period is 100 μs.

6) After correctly receiving a corresponding data packet, a node may directly transmit a management and control frame (for example, an Acknowledgement (ACK) frame) corresponding to the data packet on a designated channel without performing CCA. The node needs to ensure that such continuously transmitted frames cannot exceed the maximum COT mentioned above.

After receiving the permission of the designated channel authorized by the initiating node within the period, the responding node may perform the following operations:

In a case that the responding node initiates transmission with a maximum interval of 16 μs after the last authorized transmission instructed by the initiating node is performed, the responding node does not need to perform CCA before transmission, or otherwise, CCA is performed before the beginning of the authorized transmission. Authorization is discarded in a case that the channel is determined to be busy, or otherwise, transmission may be initiated on the designated channel, where the channel may occupy a remaining part of the COT within a current fixed frame period at most, transmission may be initiated for a plurality times as long as each time interval between adjacent transmissions does not exceed 16 μs, and the authorization is discarded after transmission is completed.

(3) Random Access Signal Transmission by a Frame Based Equipment

In an NR system, system information transmitted by the base station may be configured as an FBE channel access (that is, semi-static channel access) mode. In such a mode, before transmitting the random access signal, the terminal needs to confirm that downlink transmission is detected within the fixed frame period, or otherwise transmission cannot be performed.

Figures 3, 4:
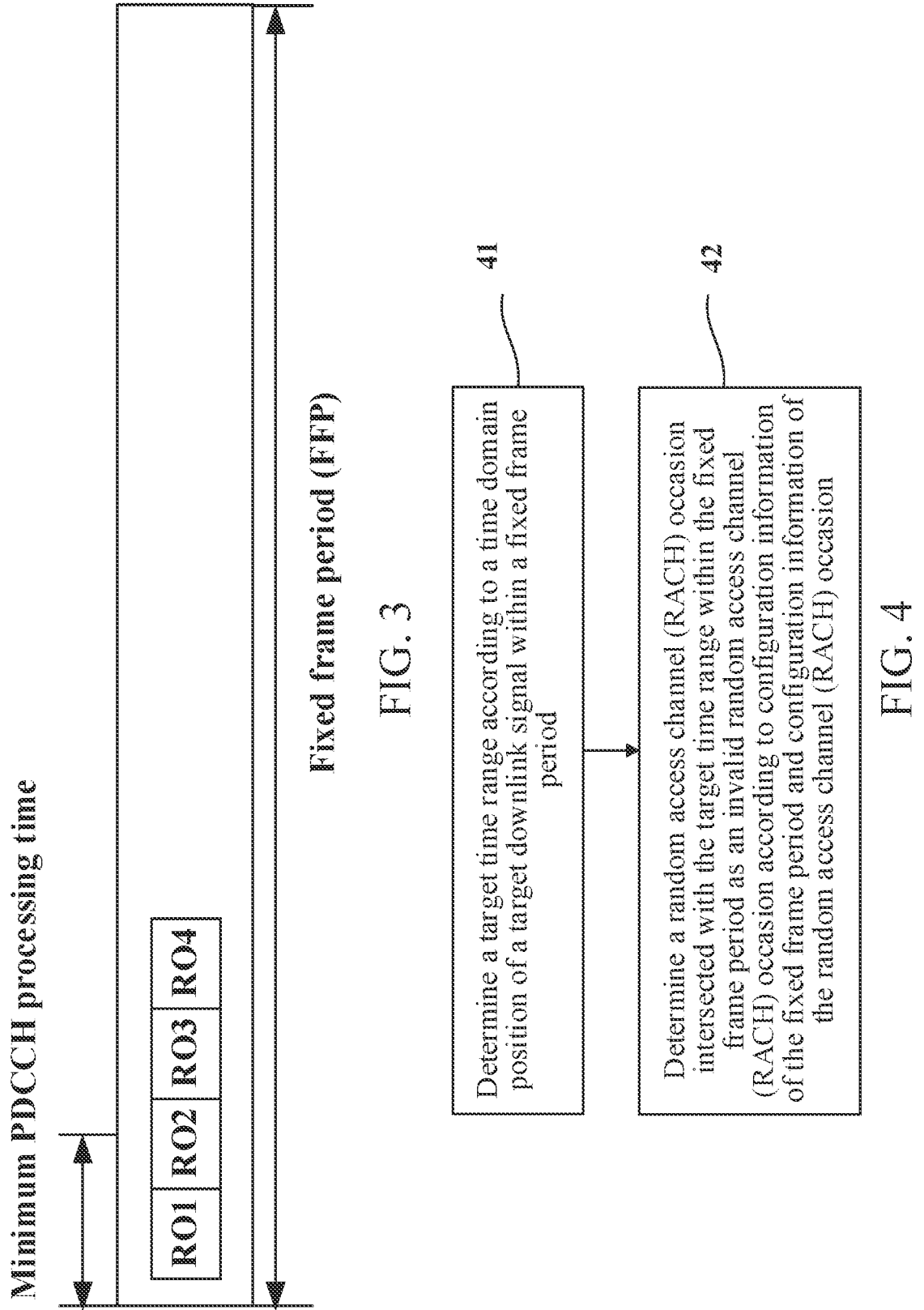
FIG. 3 is a schematic diagram of a reason for transmission failure at an RACH occasion.
FIG. 4 is a schematic flowchart of a random access signal transmission method according to an embodiment of the present disclosure.

As shown in FIG. 3, a plurality of RACH Occasions (ROs) are configured within a fixed frame period, and such ROs needs to map with corresponding Synchronization Signal and PBCH blocks (SSBs) according to a current technical solution. However, in a case that there is no downlink signal configured or the downlink signal is configured but a processing time is not enough before the ROs within the fixed frame period, transmission cannot be performed at some or all of the ROs, that is, users under the SSBs cannot access, seriously affecting the access performance of the system.

To resolve the foregoing method, referring to FIG. 4, an embodiment of the present disclosure provides a random access signal transmission method, applied to a terminal, the method including:

Step 41: Determine a target time range according to a time domain position of a target downlink signal within a fixed frame period.

Step 42: Determine an RACH occasion intersected with the target time range within the fixed frame period as an invalid RACH occasion according to configuration information of the fixed frame period and configuration information of the RACH occasion.

In some embodiments, the invalid RACH occasion is not used for mapping with the synchronization signal and PBCH block, and therefore, is not used for transmission of the random access signal.

In some embodiments, the invalid RACH occasion does not map with a channel state information reference signal.

In the embodiments of the present disclosure, a target time range may be determined according to a target downlink signal within a fixed frame period. In a case that RACH occasion is configured within the fixed frame period, a RACH occasion intersected (which is overlapped in a time domain) with the target time range may be determined as an invalid RACH occasion that is not used for mapping with a synchronization signal and PBCH block, which can avoid the problem that a random access signal cannot be transmitted due to lack of downlink signal configuration or insufficient time for processing a downlink signal within the fixed frame period, affecting access performance of a system.

For example, in this embodiment of the present disclosure, the random access signal transmission method further includes:

determining an RACH occasion not intersected (that is, not overlapped in a time domain) with the target time range within the fixed frame period as a valid RACH occasion; and mapping the valid RACH occasion with a synchronization signal and PBCH block, thereby performing transmission of a random access signal.

In some embodiments, the valid RACH occasion maps with the channel state information reference signal.

The target downlink signal in the foregoing embodiments may be of various types, which is described below by using examples.

(1) The target downlink signal includes at least one of the following: a Physical Downlink Control Channel (PDCCH) or an SSB.

In this embodiment of the present disclosure, a time domain position of the PDCCH and/or the synchronization signal and PBCH block may be determined according to configuration information of the PDCCH and/or configuration information of the synchronization signal and PBCH block, thereby determining the target time range.

the target time range is at least one of the following:

1) a first time range, the first time range being from an initiation time of the fixed frame period to a start time or an end time of a Control Resource Set (CORESET) in which a first PDCCH configured within the fixed frame period is located;

2) a second time range, the second time range being from the initiation time of the fixed frame period to a start time or an end time of a first synchronization signal and PBCH block configured within the fixed frame period;

3) a third time range, the third time range being X resource elements after the start time or X resource elements after the end time of the control resource set in which the first PDCCH configured within the fixed frame period is located from the initiation time of the fixed frame period;

4) a fourth time range, the fourth time range being X resource elements after the start time or X resource elements after the end time of the first synchronization signal and PBCH block configured within the fixed frame period from the initiation time of the fixed frame period;

5) a fifth time range, the fifth time range being initial X resource elements of the fixed frame period; or 6) an intersection or a union of any two or more of the first time range, the second time range, the third time range, the fourth time range, or the fifth time range, the resource element being a symbol or a slot.

X is predefined, configured according to system information, or configured by Radio Resource Control (RRC). X is related to a time for processing the target downlink signal.

For example, in this embodiment of the present disclosure, the PDCCH is a PDCCH of a common search space type. The PDCCH includes one or more of the following: a Type 0 PDCCH, a Type 0A PDCCH, a Type 1 PDCCH, a Type 2 PDCCH, or a Type 3 PDCCH. In other words, in a case there is only one type of the PDCCH, for example, Type 0, the foregoing first PDCCH is the first Type 0 PDCCH in this case. In a case that there are a plurality of types of PDCCH, for example, including the Type 0 PDCCH, the Type 0A PDCCH, and the Type 1 PDCCH, the first PDCCH is the first Type 0 PDCCH, Type 0A PDCCH, or Type 1 PDCCH that appears.

For example, in this embodiment of the present disclosure, the random access signal transmission method further includes: determining that all RACH occasions within the fixed frame period are invalid RACH occasions in a case that the target downlink signal does not exist within the fixed frame period.

For example, in this embodiment of the present disclosure, the target downlink signal is a downlink signal on an initial Bandwidth Part (BWP) or a BWP including the initial BWP.

In the foregoing embodiments, an existing PDCCH and/or SSB is used as the target downlink signal to determine whether the RACH occasion is invalid, and configuration for detecting the downlink signal is not additionally introduced. In this way, a relatively slight change is made to the system, and implementation is easy.

(2) The target downlink signal is a first downlink detection signal transmitted within initial Y resource elements of the fixed frame period configured with the RACH occasion, the resource element being a symbol or a slot.

In this embodiment of the present disclosure, before the determining a target time range according to a time domain position of a target downlink signal within a fixed frame period, the method further includes:

determining the fixed frame period configured with the RACH occasion according to the configuration information of the fixed frame period and the configuration information of the RACH occasion; and determining the initial Y resource elements of the fixed frame period configured with the RACH occasion as a time domain position of the first downlink detection signal.

In other words, the time domain position of the first downlink detection signal may be implicitly determined according to the configuration information of the fixed frame period and the configuration information of the RACH occasion.

In this embodiment of the present disclosure, Y is predefined, configured according to system information, or configured by RRC.

In this embodiment of the present disclosure, the target time range is at least one of the following:

1) a time occupied by the first downlink detection signal within the fixed frame period; or 2) X resource elements after a start time or X resource elements after an end time of the first downlink detection signal from an initiation time of the fixed frame period, the resource element being a symbol or a slot.

In this embodiment of the present disclosure, X is predefined, configured according to system information, or configured by RRC. X is related to a time for processing the target downlink signal.

For example, in this embodiment of the present disclosure, the first downlink detection signal includes at least one of the following:

1) a Group Common PDCCH (GC-PDCCH) or a Common PDCCH (C-PDCCH), where the GC-PDCCH or the C-PDCCH is a newly defined PDCCH, and other configuration information other than time domain information may be stipulated in an agreement, and/or configured according to system information, and/or configured according to RRC information;

2) a Type 0 PDCCH, a Type 0A PDCCH, a Type 1 PDCCH, a Type 2 PDCCH, or a Type 3 PDCCH, where other configuration information other than time domain information of the Type 0 PDCCH, the Type 0A PDCCH, the Type 1 PDCCH, the Type 2 PDCCH, or the Type 3 PDCCH may reuse configuration of the Type 0 PDCCH, the Type 0A PDCCH, the Type 1 PDCCH, the Type 2 PDCCH, or the Type 3 PDCCH; or 3) a predefined sequence.

For example, the predefined sequence is one of the following: a Primary Synchronization Signal (PSS), a Secondary Synchronization Signal (SSS), a Channel State Information Reference Signal (CSI-RS), or a wideband-Demodulation Reference Signal (DM-RS).

In some embodiments, the first downlink detection signal does not carry any information or carries information related to an RACH.

In some embodiments, the random access signal includes a random access pilot or a Physical Uplink Shared Channel (PUSCH) in MsgA in a 2-step random access procedure.

In this embodiment of the present disclosure, a dedicated target downlink signal is newly defined to determine whether an RACH occasion within the fixed frame period is invalid, and the target signal is a dedicated signal. In this way, it may be ensured that a downlink signal is existed within each fixed frame period in which the RACH occasion is configured.

The random access signal transmission method provided in this embodiment of the present disclosure is described below with reference to specific embodiments.

In a first embodiment of the present disclosure:

The terminal determines a time domain position of a first common PDCCH within a fixed frame period according to configuration information of a common search space and configuration information of the fixed frame period, so that a target time range is determined.

Figures 5, 6:
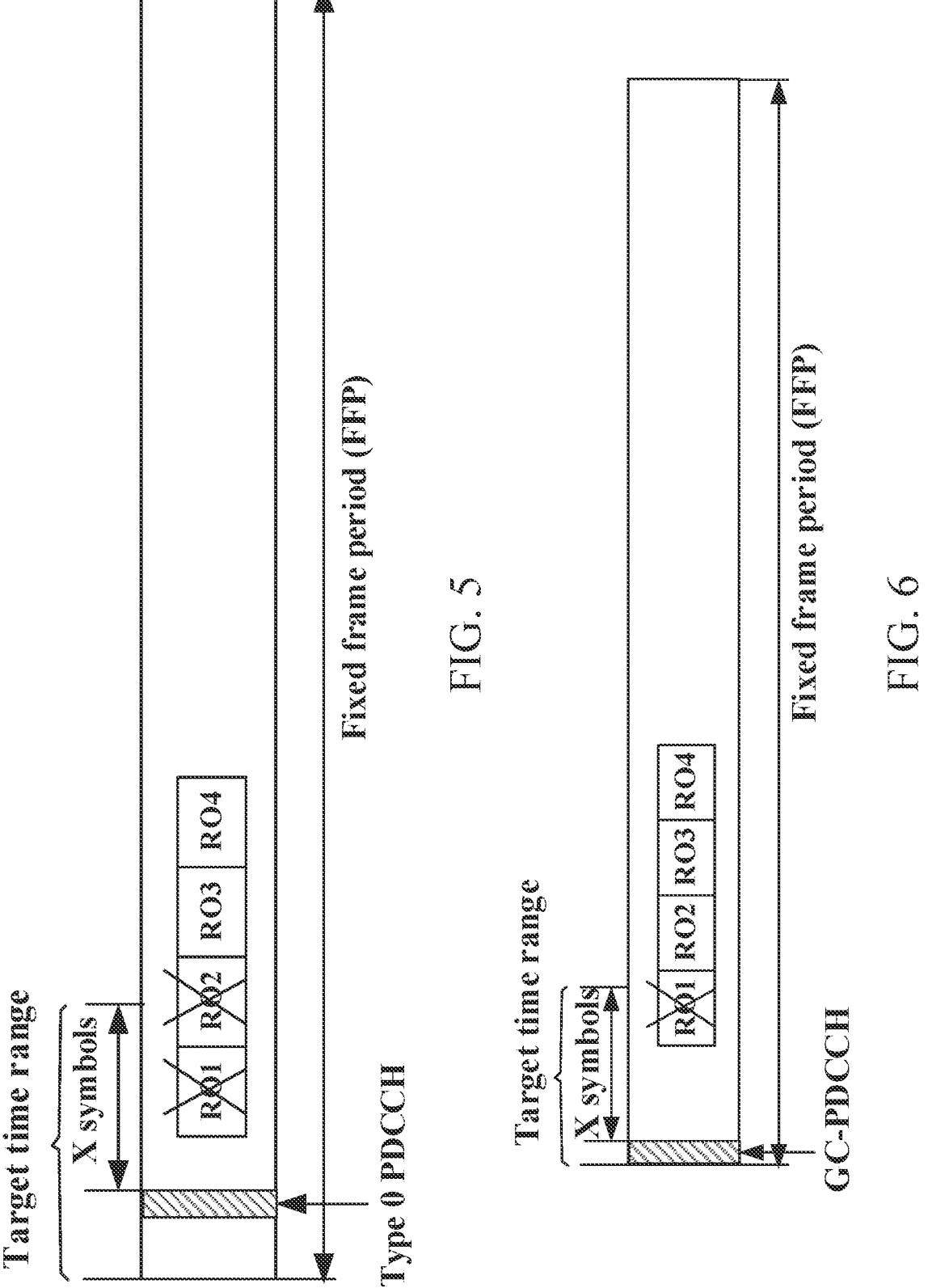
FIG. 5 is a schematic diagram of a random access signal transmission method according to a first embodiment of the present disclosure.
FIG. 6 is a schematic diagram of a random access signal transmission method according to a second embodiment of the present disclosure.

As shown in FIG. 5, the target time range is X symbols after an end time of a control resource set associated with a Type 0 PDCCH search space within an FFP.

The terminal determines time domain positions (RO1, RO2, RO3, and RO4) of RACH occasions according to configuration information of the RACH occasions in the system information, and determines RACH occasions intersected with the target time range as invalid RACH occasions (such as RO1 and RO2), where the RACH occasions do not map with SSBs. For example, the invalid RACH occasion does not map with a channel state information reference signal.

In a second embodiment of the present disclosure:

The terminal determines an FFP configured with an RACH occasion according to the configuration information of the fixed frame period and the configuration information of the RACH occasion in the system information, and receives a predefined downlink detection signal (such as the GC-PDCCH) within previous Y symbols of the fixed frame period configured with the RACH occasion, thereby determining that the target time range is X symbols after an end time of the downlink detection signal.

The terminal determines time domain positions (RO1, RO2, RO3, and RO4) of RACH occasions according to configuration information of the RACH occasions in the system information, and determines an RACH occasion intersected with the target time range as an invalid RACH occasion (such as RO1), where the RACH occasion does not map with an SSB. In some embodiments, the invalid RACH occasion does not map with a channel state information reference signal.

Figure 7:
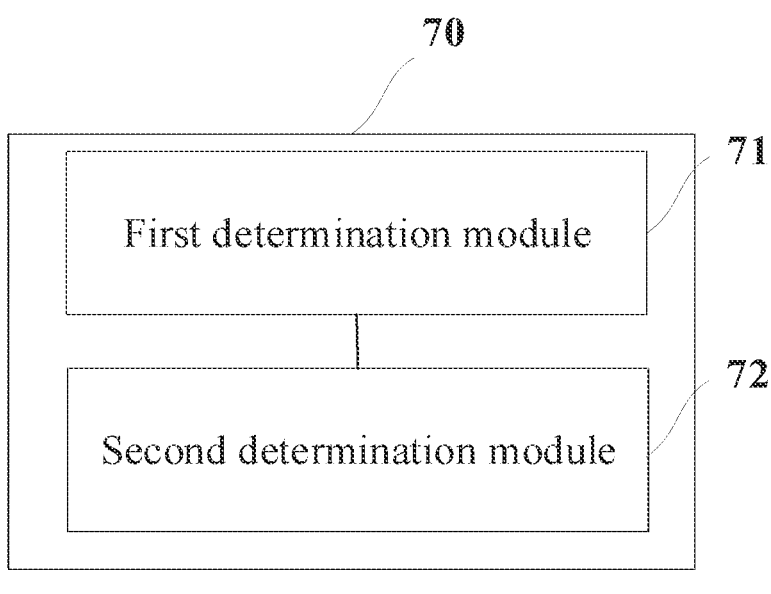
FIG. 7 is a schematic structural diagram of a terminal according to an embodiment of the present disclosure.

Referring to FIG. 7, FIG. 7 is a schematic structural diagram of a terminal according to an embodiment of the present disclosure. The terminal includes:

a first determination module 71, configured to determine a target time range according to a time domain position of a target downlink signal within a fixed frame period; and a second determination module 72, configured to determine an RACH occasion intersected with the target time range within the fixed frame period as an invalid RACH occasion according to configuration information of the fixed frame period and configuration information of the RACH occasion.

In the embodiments of the present disclosure, a target time range may be determined according to a target downlink signal within a fixed frame period, and an RACH occasion intersected with the target time range within the fixed frame period may be determined as an invalid RACH occasion that is not used for mapping with a synchronization signal and PBCH block, which can avoid the problem that a random access signal cannot be transmitted due to lack of downlink signal configuration or insufficient time for processing a downlink signal within the fixed frame period, affecting access performance of a system.

For example, the invalid RACH occasion does not map with a channel state information reference signal.

For example, the terminal provided in this embodiment of the present disclosure further includes:

a third determination module, configured to determine a random access channel (RACH) occasion not intersected with the target time range within the fixed frame period as a valid RACH occasion; and a mapping module, configured to map the valid RACH occasion with a synchronization signal and PBCH block.

For example, the valid RACH occasion maps with the channel state information reference signal.

For example, in some embodiments of the present disclosure, the target downlink signal includes at least one of the following: a PDCCH or a synchronization signal and PBCH block.

For example, the target time range is at least one of the following:

a first time range, the first time range being from an initiation time of the fixed frame period to a start time or an end time of a control resource set in which a first PDCCH configured within the fixed frame period is located;

a second time range, the second time range being from the initiation time of the fixed frame period to a start time or an end time of a first synchronization signal and PBCH block configured within the fixed frame period;

a third time range, the third time range being X resource elements after the start time or X resource elements after the end time of the control resource set in which the first PDCCH configured within the fixed frame period is located from the initiation time of the fixed frame period;

a fourth time range, the fourth time range being X resource elements after the start time or X resource elements after the end time of the first synchronization signal and PBCH block configured within the fixed frame period from the initiation time of the fixed frame period;

a fifth time range, the fifth time range being initial X resource elements of the fixed frame period; or an intersection or a union of any two or more of the first time range, the second time range, the third time range, the fourth time range, or the fifth time range, the resource element being a symbol or a slot.

For example, the PDCCH includes one or more of the following: a Type 0 PDCCH, a Type 0A PDCCH, a Type 1 PDCCH, a Type 2 PDCCH, or a Type 3 PDCCH.

For example, the terminal provided in this embodiment of the present disclosure further includes:

a fourth determination module, configured to determine that all RACH occasions within the fixed frame period are invalid RACH occasions in a case that the target downlink signal does not exist within the fixed frame period.

For example, in some other embodiments of the present disclosure, the target downlink signal is a first downlink detection signal transmitted within initial Y resource elements of the fixed frame period configured with the RACH occasion, the resource element being a symbol or a slot.

For example, the terminal provided in this embodiment of the present disclosure further includes:

a fifth determination module, configured to determine the fixed frame period configured with the RACH occasion according to the configuration information of the fixed frame period and the configuration information of an RACH occasion; and a sixth determination module, configured to determine the initial Y resource elements of the fixed frame period configured with the RACH occasion as a time domain position of the first downlink detection signal.

For example, Y is predefined, configured according to system information, or configured by RRC.

For example, the target time range is at least one of the following:

a time occupied by the first downlink detection signal within the fixed frame period; or X resource elements after a start time or X resource elements after an end time of the first downlink detection signal from an initiation time of the fixed frame period, the resource element being a symbol or a slot.

For example, X is predefined, configured according to system information, or configured by RRC.

For example, the first downlink detection signal includes at least one of the following:

a group common PDCCH or a common PDCCH;

a Type 0 PDCCH, a Type 0A PDCCH, a Type 1 PDCCH, a Type 2 PDCCH, or a Type 3 PDCCH; or a predefined sequence.

For example, the predefined sequence is one of the following: a primary synchronization signal, a secondary synchronization signal, a channel state information reference signal, or a wideband-dedicated demodulation reference signal.

For example, the first downlink detection signal does not carry any information or carries information related to a random access channel.

For example, the target downlink signal is a downlink signal on an initial BWP or a BWP including the initial BWP.

For example, the random access signal includes a random access pilot or a PUSCH in MsgA in a 2-step random access procedure.

The terminal provided in the embodiments of the present disclosure can implement the processes implemented by the terminal in the method embodiment of FIG. 4. To avoid repetition, details are not described herein again.

Figure 8:
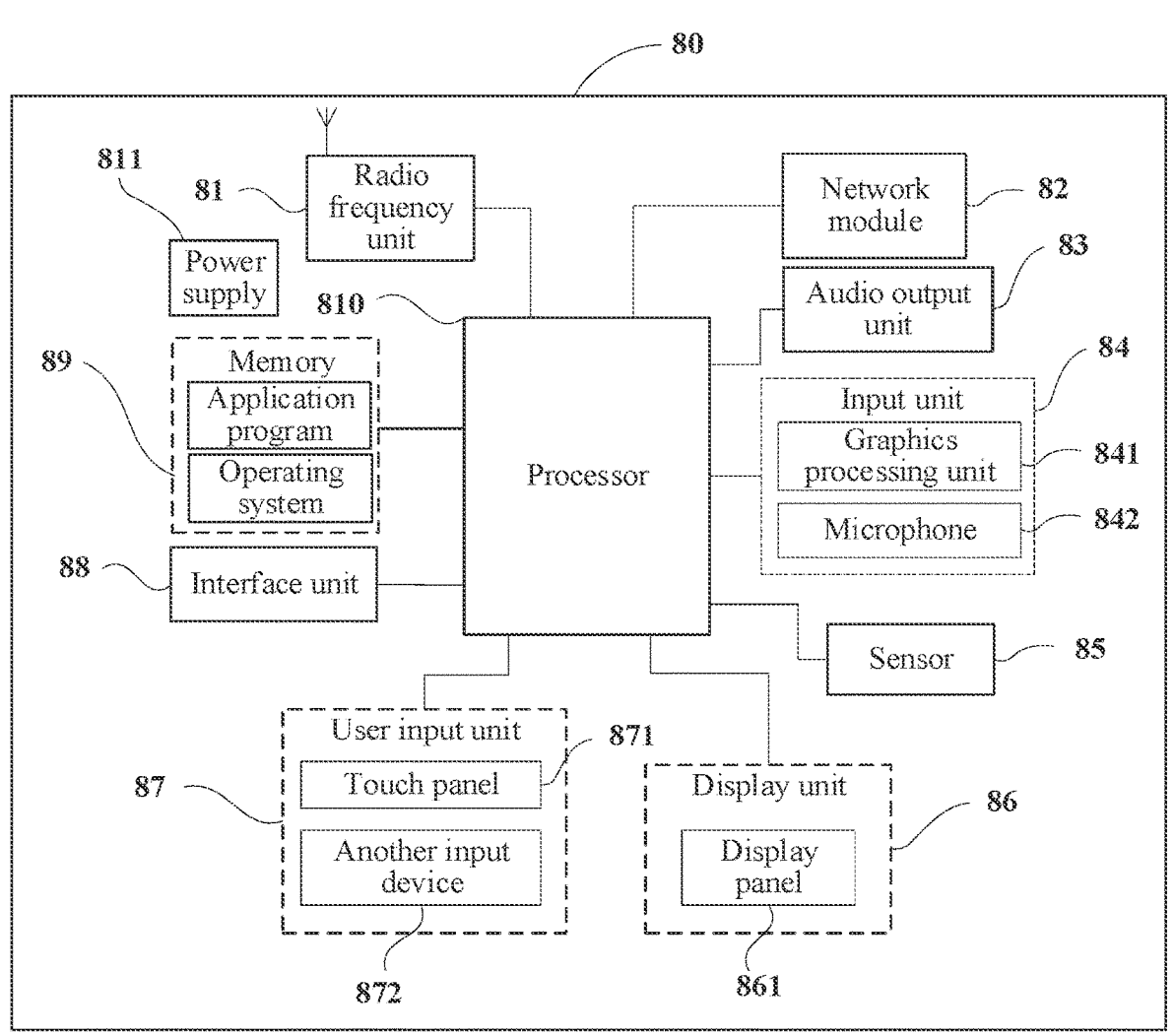
FIG. 8 is a schematic structural diagram of a terminal according to another embodiment of the present disclosure.

FIG. 8 is a schematic structural diagram of hardware of a terminal configured to implement the embodiments of the present disclosure. The terminal 80 includes, but is not limited to, components such as a radio frequency unit 81, a network module 82, an audio output unit 83, an input unit 84, a sensor 85, a display unit 86, a user input unit 87, an interface unit 88, a memory 89, a processor 810, and a power source 811. A person skilled in the art may understand that the terminal structure shown in FIG. 1 constitutes no limitation on the terminal, and the terminal may include more or fewer components than those shown in the figure, or some components may be combined, or a different component deployment may be used. The terminal in the embodiments of the present disclosure includes, but is not limited to, a mobile phone, a tablet computer, a notebook computer, a palmtop computer, an in-vehicle terminal, a wearable device, a pedometer, and the like.

The processor 810 is configured to determine a target time range according to a time domain position of a target downlink signal within a fixed frame period; and determine an RACH occasion intersected with the target time range within the fixed frame period as an invalid RACH occasion according to configuration information of the fixed frame period and configuration information of the RACH occasion.

In the embodiments of the present disclosure, a target time range may be determined according to a target downlink signal within a fixed frame period, and an RACH occasion intersected with the target time range within the fixed frame period may be determined as an invalid RACH occasion that is not used for mapping with a synchronization signal and PBCH block, which can avoid the problem that a random access signal cannot be transmitted due to lack of downlink signal configuration or insufficient time for processing a downlink signal within the fixed frame period, affecting access performance of a system. The terminal provided in the embodiments of the present disclosure can implement the processes implemented by the terminal in the method embodiment of FIG. 4. To avoid repetition, details are not described herein again.

It should be understood that, in the embodiments of the present disclosure, the radio frequency unit 81 may be configured to send and receive a signal in an information receiving and sending process or a call process. For example, the radio frequency unit receives downlink data from a base station, and then delivers the downlink data to the processor 810 for processing; and in addition, sends uplink data to the base station. Generally, the radio frequency unit 81 includes, but is not limited to, an antenna, at least one amplifier, a transceiver, a coupler, a low noise amplifier, a duplexer, and the like. In addition, the radio frequency unit 81 may further communicate with another device through a wireless communication system and a network.

The terminal provides wireless broadband Internet access for a user by using the network module 82, for example, allowing the user to send and receive emails, browse webpages, access streaming media content, and so on.

The audio output unit 83 may convert audio data received by the RF unit 81 or the network module 82 or stored in the memory 89 into an audio signal and output the audio signal as a sound. In addition, the audio output unit 83 may provide an audio output (such as a call signal receiving sound or a message receiving sound) related to a specific function executed by the terminal 80. The audio output unit 83 includes a speaker, a buzzer, a receiver, and the like.

The input unit 84 is configured to receive an audio or video signal. The input unit 84 may include a Graphics Processing Unit (GPU) 841 and a microphone 842. The graphics processing unit 841 performs processing on image data of a static picture or a video acquired by an image acquisition device (for example, a camera) in a video acquisition mode or an image acquisition mode. The processed image frame can be displayed on the display unit 86. An image frame processed by the graphics processing unit 841 may be stored in the memory 89 (or another storage medium) or sent by using the radio frequency unit 81 or the network module 82. The microphone 842 may receive a sound and can process such a sound into audio data. The processed audio data may be converted, in a phone call mode, into a format that may be sent by the radio frequency unit 81 to a mobile communication base station.

The terminal 80 further includes at least one sensor 85 such as an optical sensor, a motion sensor, and another sensor. For example, the optical sensor includes an ambient light sensor and a proximity sensor. The ambient light sensor may adjust luminance of a display panel 861 according to the luminance of ambient light, and the proximity sensor may switch off the display panel 861 and backlight when the terminal 80 is moved to an ear. As one type of motion sensor, an acceleration sensor may detect magnitude of accelerations in various directions (generally on three axes), and detect the magnitude and direction of gravity at rest. The acceleration sensor is configured to recognize the attitude of the terminal (for example, switching between landscape orientation and portrait orientation, related gaming, and magnetometer attitude calibration), a function related to vibration recognition (such as a pedometer and a knock), and the like. The sensor 85 may further include a fingerprint sensor, a pressure sensor, an iris sensor, a molecular sensor, a gyroscope, a barometer, a hygrometer, a thermometer, an infrared sensor, and the like, which will not be described in detail herein.

The display unit 86 is configured to display information inputted by the user or information to be presented to the user. The display unit 86 may include a display panel 861. The display panel 861 may be configured in a form of a Liquid Crystal Display (LCD), an Organic Light-Emitting Diode (OLED), or the like.

The user input unit 87 is configured to receive inputted digital or character information, and generate a key signal input related to user settings and function control of the terminal. For example, the user input unit 87 may include a touch panel 871 and other input devices 872. The touch panel 871, also referred to as a touch screen, is configured to collect a touch operation made by the user on or in proximity to the touch panel 871 (e.g., an operation made by the user through any appropriate object or attachment (e.g., finger or stylus) on or in proximity to the touch panel 871). The touch panel 871 may include a touch detection apparatus and a touch controller. The touch detection apparatus is configured to detect a touch position of the user and a signal generated due to the touch operation, and transmit the signal to the touch controller. The touch controller is configured to receive touch information from the touch detection apparatus, convert the touch information into coordinates of a touch point, transmit the coordinates to the processor 810, and receive and execute a command sent from the processor 810. In addition, the touch panel 871 may be of a resistive type, a capacitive type, an infrared type, or a surface acoustic wave type. In addition to the touch panel 871, the user input unit 87 may further include the another input device 872. For example, the other input devices 872 include, but not limited to, a physical keyboard, a functional button (such as a volume control button or an on/off button), a trackball, a mouse, and a joystick, which will not be described in detail herein.

Further, the touch panel 871 may cover the display panel 861. When detecting a touch operation made on or in proximity to the touch panel 871, the touch panel 871 transmits the touch information to the processor 810 so as to determine a type of a touch event. Then, the processor 810 provides a corresponding visual output on the display panel 861 in accordance with the type of the touch event. Although the touch panel 871 and the display panel 861 are used as two separate parts to implement input and output functions of the terminal in FIG. 8, in some embodiments, the touch panel 871 and the display panel 861 may be integrated to implement the input and output functions of the terminal, which is not limited herein.

The interface unit 88 is an interface configured to connect an external apparatus to the terminal 80. For example, the external apparatus may include a wired or wireless headset port, an external power supply (or a battery charger) port, a wired or wireless data port, a storage card port, a port used to connect an apparatus having an identification module, an audio input/output (Input/Output, I/O) port, a video I/O port, an earphone port, and the like. The interface unit 88 is configured to receive an input (such as data information or electric power) from the external apparatus and transmit the received input to one or more elements in the terminal 80 or is configured to transmit data between the terminal 80 and the external apparatus.

The memory 89 is configured to store a software program and various data. The memory 89 may mainly include a program storage area and a data storage area. The program storage area may store an operating system, an application program required by at least one function (for example, a sound playback function and an image playback function), or the like. The data storage area may store data (for example, audio data and a phone book) created according to use of the mobile phone. In addition, the memory 89 may include a high speed random access memory, and may further include a non-volatile memory, such as at least one magnetic disk storage device, a flash memory, or another volatile solid storage device.

The processor 810 is the control center of the terminal, and is connected to various parts of the terminal by various interfaces and lines. By running or executing the software program and/or module stored in the memory 89 and invoking data stored in the memory 89, the processor 810 performs various functions of the terminal and processes data, thereby monitoring the terminal. The processor 810 may include one or more processing units. Exemplarily, the processor 810 may integrate an application processor and a modem processor. The application processor mainly handles operating systems, user interfaces, applications, and the like. The modem processor mainly handles wireless communication. It may be understood that the modem processor may not be integrated into the processor 810.

The terminal 80 further includes the power source 811 (such as a battery) configured to supply power to the components. Exemplarily, the power source 811 may be logically connected to the processor 810 by a power management system, so as to implement functions such as charging, discharging, and power consumption management via the power management system.

In addition, the terminal 80 includes some functional modules not shown, which will not be described in detail herein.

Exemplarily, an embodiment of the present disclosure further provides a terminal 130, including a processor 131, a memory 132, and a computer program stored in the memory 132 and executable by the processor 131. The computer program, when executed by the processor 131, implements the processes of the embodiments of the foregoing random access signal transmission method, and the same technical effects can be achieved, which will not be described in detail herein again to avoid repetition.

Figure 9:
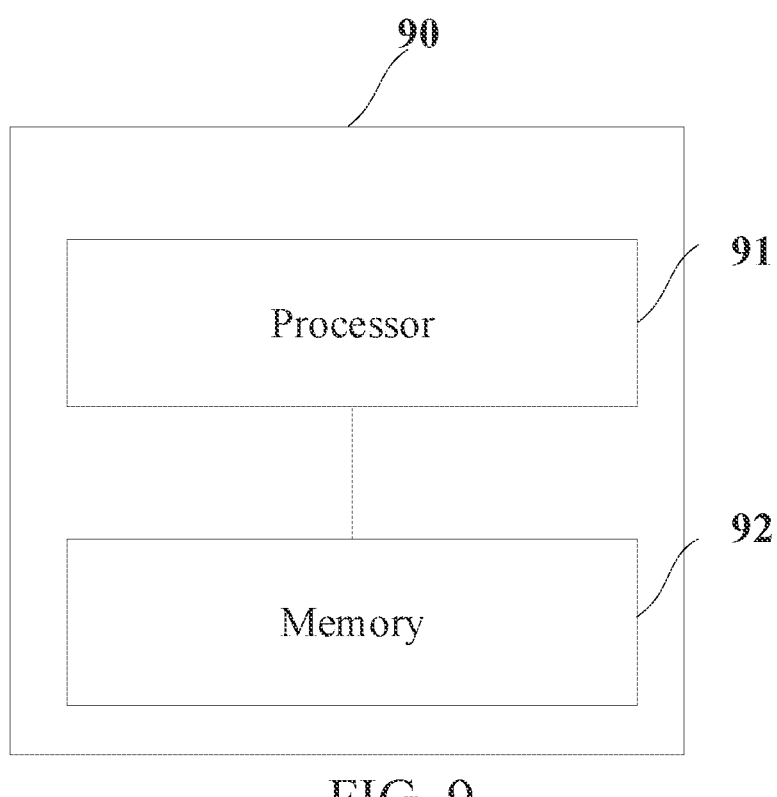
FIG. 9 is a schematic structural diagram of a terminal according to still another embodiment of the present disclosure.

Referring to FIG. 9, an embodiment of the present disclosure further provides a terminal 90, including a processor 91, a memory 92, and a computer program stored in the memory 92 and executable by the processor 101. The computer program, when executed by the processor 91, implements the processes of the embodiments of the foregoing random access signal transmission method shown in FIG. 4, and the same technical effects can be achieved, which will not be described in detail herein again to avoid repetition.

An embodiment of the present disclosure further provides a non-transitory computer-readable storage medium, storing a computer program, where the computer program, when executed by a processor, implements the processes of the foregoing method embodiments of the random access signal transmission method shown in FIG. 4, and the same technical effect can be achieved. To avoid repetition, details are not repeated herein.

The non-transitory computer-readable storage medium is, for example, a Read-Only Memory (ROM), a Random Access Memory (RAM), a magnetic disk, an optical disc, or the like.

It is to be noted that, the terms "include", "comprise", or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Unless otherwise specified, elements defined by the sentence "including one" does not exclude that there are still other same elements in the processes, methods, objects, or apparatuses.

A person of ordinary skill in the art may be aware that the units and steps in the examples described with reference to the embodiments disclosed in this specification can be implemented by electronic hardware or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art may clearly understand that for convenience and conciseness of description, for specific working processes of the foregoing described system, apparatus and unit, reference may be made to the corresponding processes in the foregoing method embodiments, and details are not described herein.

In the embodiments provided in this application, it is to be understood that the disclosed apparatus and method may be implemented in other manners. For example, the described apparatus embodiment is merely exemplary. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

Through the foregoing description on the implementations, a person skilled in the art can clearly learn that the foregoing embodiment methods may be implemented by using software in combination with a necessary universal hardware platform. The embodiment methods may also be implemented by using hardware, but the former is a better implementation in many cases. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of the present disclosure.

A person of ordinary skill in the art may understand that all or some of the processes of the methods in the foregoing embodiments may be implemented by a computer program controlling relevant hardware. The program may be stored in a non-transitory computer-readable storage medium. During the execution of the program, processes of the foregoing method embodiments may be included. The storage medium may be a magnetic disk, an optical disc, an ROM, an RAM, or the like.

It may be understood that, the embodiments described in the embodiments of the present disclosure may be implemented by using software, hardware, firmware, middleware, microcode, or a combination thereof. For hardware implementation, the module, unit, and subunit may be implemented by one or more Application Specific Integrated Circuits (ASICs), Digital Signal Processors (DSPs), DSP Devices (DSPDs), Programmable Logic Devices (PLDs), Field-Programmable Gate Arrays (FPGAs), general-purpose processors, controllers, microcontrollers, microprocessors, other electronic components configured to implement the functions of the present disclosure, or a combination thereof.

For software implementation, the technology described in the embodiments of the present disclosure may be implemented by using modules (for example, processes and functions) implementing the functions of the embodiments of the present disclosure. Software code may be stored in a memory and executed by a processor. The memory may be implemented in the processor or outside the processor.

The implementations of the present disclosure have been described above with reference to the accompanying drawings. The present disclosure is not limited to the specific implementations described above, and the specific embodiments described above are merely exemplary and not limitative. A person of ordinary skill in the art may make various variations under the enlightenment of the present disclosure without departing from the spirit of the present disclosure and the protection scope of the claims, and such variations shall all fall within the protection scope of the present disclosure.

What is claimed is:

1. A random access signal transmission method, performed by a terminal, comprising:
    determining a target time range according to a time domain position of a target downlink signal within a fixed frame period; and
    determining a Random Access Channel (RACH) occasion intersected with the target time range within the fixed frame period as an invalid RACH occasion according to configuration information of the fixed frame period and configuration information of the RACH occasion, wherein the target downlink signal comprises at least one of the following:
        a Physical Downlink Control Channel (PDCCH), or
        a first downlink detection signal transmitted within initial Y resource elements of the fixed frame period configured with the RACH occasion, wherein the resource element is a symbol or a slot, and Y is a positive integer number.

2. The random access signal transmission method according to claim 1, wherein after the determining a target time range according to a time domain position of a target downlink signal within a fixed frame period, the method further comprises:
    determining a RACH occasion not intersected with the target time range within the fixed frame period as a valid RACH occasion; and
    mapping the valid RACH occasion with a synchronization signal and Physical Broadcast Channel (PBCH) block (SSB).

3. The random access signal transmission method according to claim 1, wherein the target downlink signal further comprises a synchronization signal and Physical Broadcast Channel (PBCH) block (SSB).

4. The random access signal transmission method according to claim 3, wherein the target time range is at least one of the following:
    a first time range being from an initiation time of the fixed frame period to a start time or an end time of a control resource set in which a first PDCCH configured within the fixed frame period is located;
    a second time range being from the initiation time of the fixed frame period to a start time or an end time of a first SSB configured within the fixed frame period;
    a third time range being X resource elements after the start time or X resource elements after the end time of the control resource set in which the first PDCCH configured within the fixed frame period is located from the initiation time of the fixed frame period;

a fourth time range being X resource elements after the start time or X resource elements after the end time of the first SSB configured within the fixed frame period from the initiation time of the fixed frame period;

a fifth time range being initial X resource elements of the fixed frame period; or an intersection or a union of any two or more of the first time range, the second time range, the third time range, the fourth time range, or the fifth time range, wherein the resource element is a symbol or a slot, wherein X is a positive integer number.

5. The random access signal transmission method according to claim 4, wherein X is predefined, configured according to system information, or configured by Radio Resource Control (RRC).

6. The random access signal transmission method according to claim 3, further comprising:

determining that all RACH occasions within the fixed frame period are invalid RACH occasions when the target downlink signal does not exist within the fixed frame period.

7. The random access signal transmission method according to claim 1, wherein the PDCCH comprises one or more of the following: a Type 0 PDCCH, a Type 0A PDCCH, a Type 1 PDCCH, a Type 2 PDCCH, or a Type 3 PDCCH.

8. The random access signal transmission method according to claim 1, wherein before the determining a target time range according to a time domain position of a target downlink signal within a fixed frame period, the method further comprises:

determining the fixed frame period configured with the RACH occasion according to the configuration information of the fixed frame period and the configuration information of the RACH occasion; and determining the initial Y resource elements of the fixed frame period configured with the RACH occasion as a time domain position of the first downlink detection signal.

9. The random access signal transmission method according to claim 1, wherein Y is predefined, configured according to system information, or configured by Radio Resource Control (RRC).

10. The random access signal transmission method according to claim 1, wherein the target time range is at least one of the following:

a time occupied by the first downlink detection signal within the fixed frame period; or X resource elements after a start time or X resource elements after an end time of the first downlink detection signal from an initiation time of the fixed frame period, wherein the resource element is a symbol or a slot, wherein X is a positive integer number.

11. The random access signal transmission method according to claim 1, wherein the first downlink detection signal comprises at least one of the following:

a group common PDCCH or a common PDCCH;

a Type 0 PDCCH, a Type 0A PDCCH, a Type 1 PDCCH, a Type 2 PDCCH, or a Type 3 PDCCH; or a predefined sequence.

12. The random access signal transmission method according to claim 11, wherein the predefined sequence is one of the following: a primary synchronization signal, a secondary synchronization signal, a channel state information reference signal, or a wideband-dedicated demodulation reference signal.

13. The random access signal transmission method according to claim 1, wherein the first downlink detection signal does not carry any information or carries information related to a random access channel.

14. The random access signal transmission method according to claim 1, wherein the target downlink signal further comprises a downlink signal on an initial Bandwidth Part (BWP) or a BWP comprising the initial BWP.

15. The random access signal transmission method according to claim 1, wherein the random access signal comprises a random access pilot or a Physical Uplink Shared Channel (PUSCH) in MsgA in a 2-step random access procedure.

16. A terminal, comprising: a memory having a computer program stored thereon; and a processor, wherein the computer program, when executed by the processor, causes the processor to perform a random access signal transmission method, comprising:

determining a target time range according to a time domain position of a target downlink signal within a fixed frame period; and determining a Random Access Channel (RACH) occasion intersected with the target time range within the fixed frame period as an invalid RACH occasion according to configuration information of the fixed frame period and configuration information of the RACH occasion, wherein the target downlink signal comprises at least one of the following:

a Physical Downlink Control Channel (PDCCH), or a first downlink detection signal transmitted within initial Y resource elements of the fixed frame period configured with the RACH occasion, wherein the resource element is a symbol or a slot, and Y is a positive integer number.

17. The terminal according to claim 16, wherein after the determining a target time range according to a time domain position of a target downlink signal within a fixed frame period, the random access signal transmission method further comprises:

determining a RACH occasion not intersected with the target time range within the fixed frame period as a valid RACH occasion; and mapping the valid RACH occasion with a synchronization signal and Physical Broadcast Channel (PBCH) block (SSB).

18. The terminal according to claim 16, wherein the target downlink signal further comprises a synchronization signal and Physical Broadcast Channel (PBCH) block (SSB).

19. A non-transitory computer-readable storage medium storing a computer program that, when executed by a processor, causes the processor to perform a random access signal transmission method, comprising:

determining a target time range according to a time domain position of a target downlink signal within a fixed frame period; and determining a Random Access Channel (RACH) occasion intersected with the target time range within the fixed frame period as an invalid RACH occasion according to configuration information of the fixed frame period and configuration information of the RACH occasion, wherein the target downlink signal comprises at least one of the following:

a Physical Downlink Control Channel (PDCCH), or a first downlink detection signal transmitted within initial Y resource elements of the fixed frame period configured with the RACH occasion, wherein the resource element is a symbol or a slot, and Y is a positive integer number.

\* \* \* \* \*